United States Patent [19]

Rienecker et al.

[11] Patent Number: 5,255,788
[45] Date of Patent: Oct. 26, 1993

[54] PRESSURE SORTER

[75] Inventors: Reimund Rienecker, Heidenheim; Peter Schweiss, Langenau; Theodor Bähr, Heidenheim, all of Fed. Rep. of Germany

[73] Assignee: J. M. Voith GmbH, Heidenheim, Fed. Rep. of Germany

[21] Appl. No.: 911,399

[22] Filed: Jul. 10, 1992

[30] Foreign Application Priority Data

Jul. 12, 1991 [DE] Fed. Rep. of Germany ....... 4123112

[51] Int. Cl.$^5$ ............................................. B07B 1/04
[52] U.S. Cl. ................................... 209/273; 210/415; 209/306; 162/55
[58] Field of Search .............. 209/240, 250, 268, 270, 209/273, 306; 210/413, 414, 415; 162/55

[56] References Cited

U.S. PATENT DOCUMENTS

| | | | |
|---|---|---|---|
| 4,252,641 | 2/1981 | Martin | 209/273 |
| 4,356,085 | 10/1982 | Schon et al. | 209/273 |
| 4,950,402 | 8/1990 | Frejborg | 209/273 X |
| 5,045,183 | 9/1991 | Schweiss et al. | 209/273 |
| 5,119,953 | 6/1992 | Atkeison, III et al. | 209/273 |

FOREIGN PATENT DOCUMENTS

| | | |
|---|---|---|
| 3023902 | 1/1982 | Fed. Rep. of Germany . |
| 0572547 | 9/1977 | U.S.S.R. ............... 209/273 |

*Primary Examiner*—Joseph E. Valenza
*Assistant Examiner*—Tuan N. Nguyen
*Attorney, Agent, or Firm*—Baker & Daniels

[57] ABSTRACT

A pressure sorter for a suspension flow includes a cylindrical housing having at least one inlet opening and at least one outlet opening with a defined pressure drop therebetween. A rotationally symmetric screen basket defining an axis is disposed within the housing. The screen basket has a plurality of openings defining a total screen perforation passage area. The axis of the screen basket is positioned offset a distance of 6 to 12% of the diameter of the screen basket. The axis of the screen basket is disposed in a plane which extends through the housing axis and is perpendicular to the housing outlet opening. A rotor and suspension sorting space are disposed centrically within the screen basket. An accepts space is disposed radially outward of the screen basket between the screen basket and the housing. The accepts space has a cross section causing a pressure drop between the suspension sorting space and the accepts space resulting in a suspension flow through the screen openings having a maximum velocity of 2.5 m/s, and a deviation to higher suspension flow velocity values from an arithmetic mean value based on the total screen perforation passage area across the entire screen basket circumference amounting to a maximum of 25% of the mean value.

8 Claims, 4 Drawing Sheets

PRESSURE SORTER

BACKGROUND OF THE INVENTION

The present invention relates to a pressure sorter, and, more particularly, to a pressure sorter having an offset screen basket.

DE-OS 30 23 902 discloses a pressure sorter of a type known in the art. A screen basket with a rotor contained therein are in the same fashion and direction offset relative to the central axis of the housing, thereby creating a sickle-shaped accepts space. Such a pressure sorter is intended to further reduce, because of the greater cross sections of it and the retardation of the outflow velocity associated with it, the pulsations in the suspension flow arising in the area of the outlet opening which are caused by the sorting elements of the rotor.

With known pressure sorters, there is a tendency, at high flow velocities of the suspension particles through the screen basket openings, for the screen basket openings to clog up through deposition or spin-on of oblong ingredients of the suspension.

SUMMARY OF THE INVENTION

It has been recognized that the flow velocity through the screen basket may amount to a maximum of about 2.5 m/s to attain a low risk of spin-on and clogging of the screen basket openings. The present invention reduces the risk of clogging the screen of the pressure sorter by maintaining the flow velocity through the screen basket at or below a maximum velocity of 2.5 m/s.

The invention comprises, in one form thereof, a pressure sorter for a suspension flow. The pressure sorter includes a cylindrical housing having at least one inlet opening and at least one outlet opening with a defined pressure drop therebetween. A rotationally symmetric screen basket is disposed within the housing. The screen basket has a plurality of openings defining a total screen perforation passage area. A rotor and suspension sorting space are disposed centrically within the screen basket. An accepts space is disposed radially outward of the screen basket between the screen basket and the housing. The accepts space has a cross section causing a pressure drop between the suspension sorting space and the accepts space resulting in a suspension flow through the screen openings having a maximum velocity of 2.5 m/s, and a deviation to higher suspension flow velocity values from an arithmetic mean based on the total screen perforation passage area across the entire screen basket circumference amounting to a maximum of 25% of the mean value.

The invention comprises, in another form thereof, a pressure sorter for a suspension flow including a cylindrical housing defining an axis. The housing has at least one inlet opening and at least one outlet opening with a defined pressure drop therebetween. A cylindrical screen basket is disposed within the housing and defines an axis. A rotor and suspension sorting space are disposed centrically within the screen basket. An accepts space is disposed radially outward of the screen basket between the screen basket and the housing. The axis of the screen basket is positioned offset a distance of 6 to 12% of the diameter of the screen basket. The axis of the screen basket is disposed in a plane which extends through the housing axis and is perpendicular to the housing outlet opening.

In yet another form of the invention, the axis of the screen basket is not disposed in a plane which extends through the housing axis and is perpendicular to the housing outlet opening; rather, the axis of the screen basket is disposed in one of a plurality of planes having a maximum intermediate angle of 15° with the plane which extends through the housing axis and is perpendicular to the housing outlet opening.

An advantage of the present invention is that the risk of clogging the openings of the screen basket is reduced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
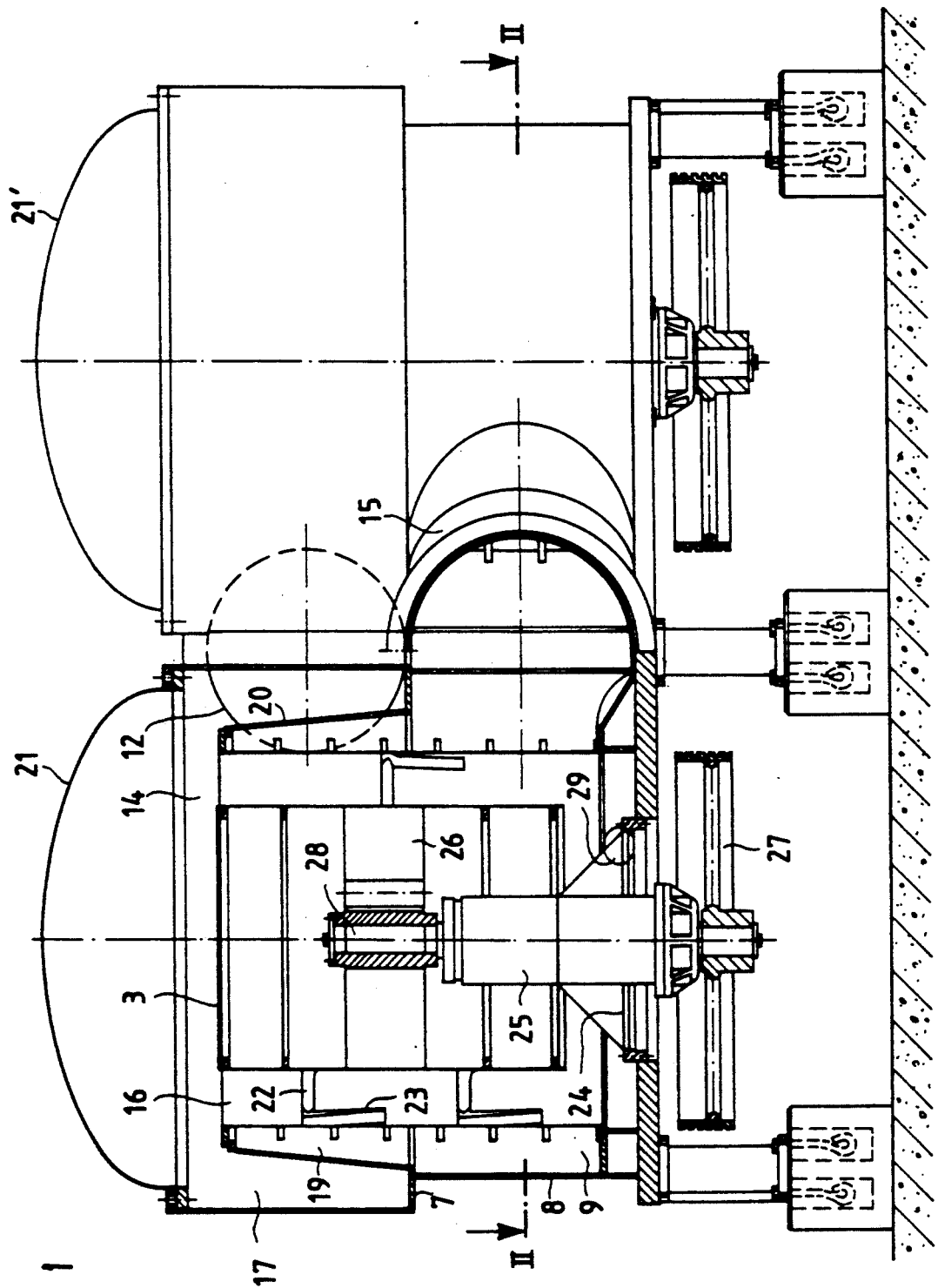
FIG. 1 is a side sectional view of an embodiment of the present inventions having a tandem housing with two housing parts.
Figure 2:
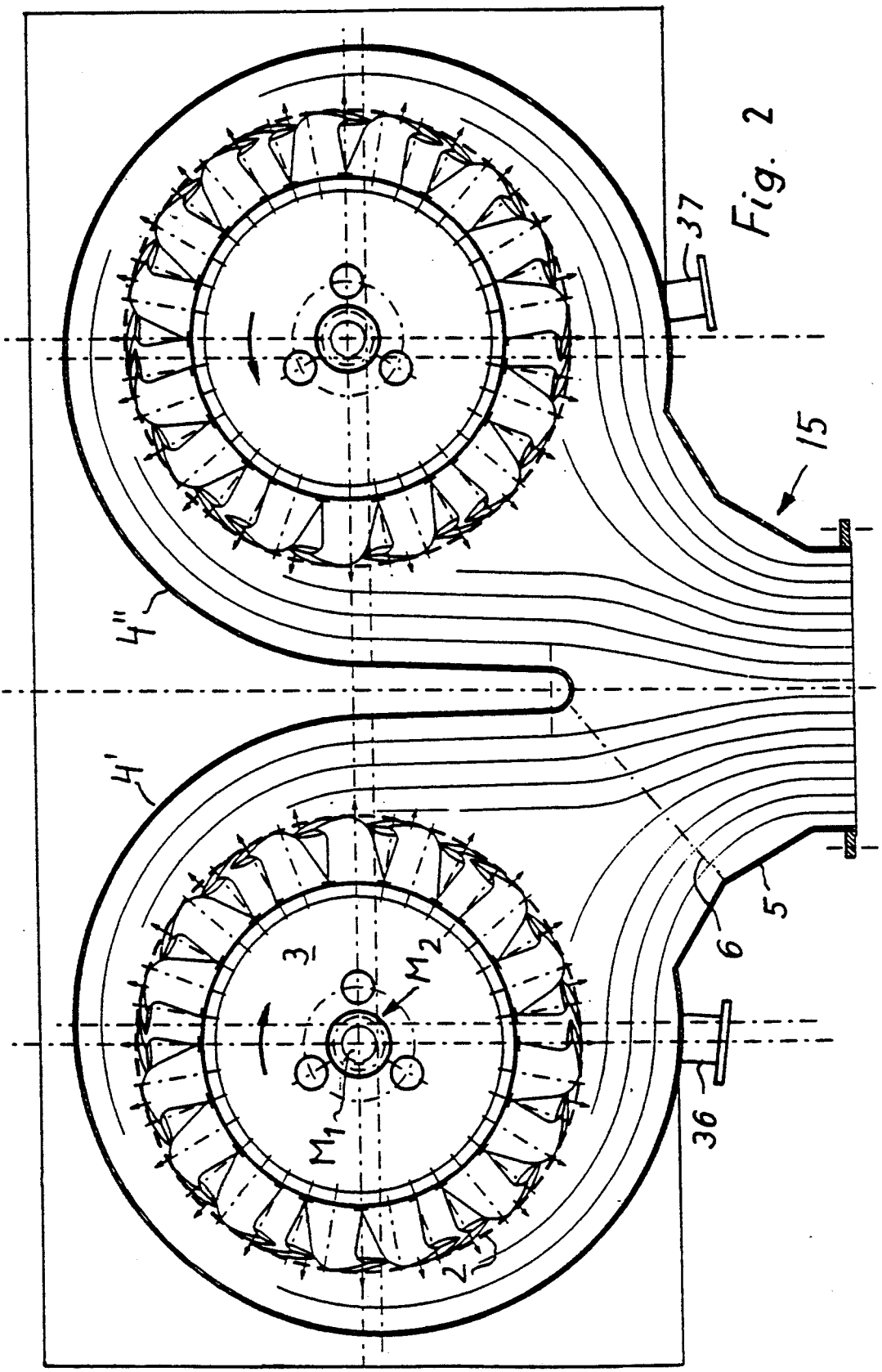
FIG. 2 is a sectional view taken along line II—II of FIG. 1.
Figure 4:
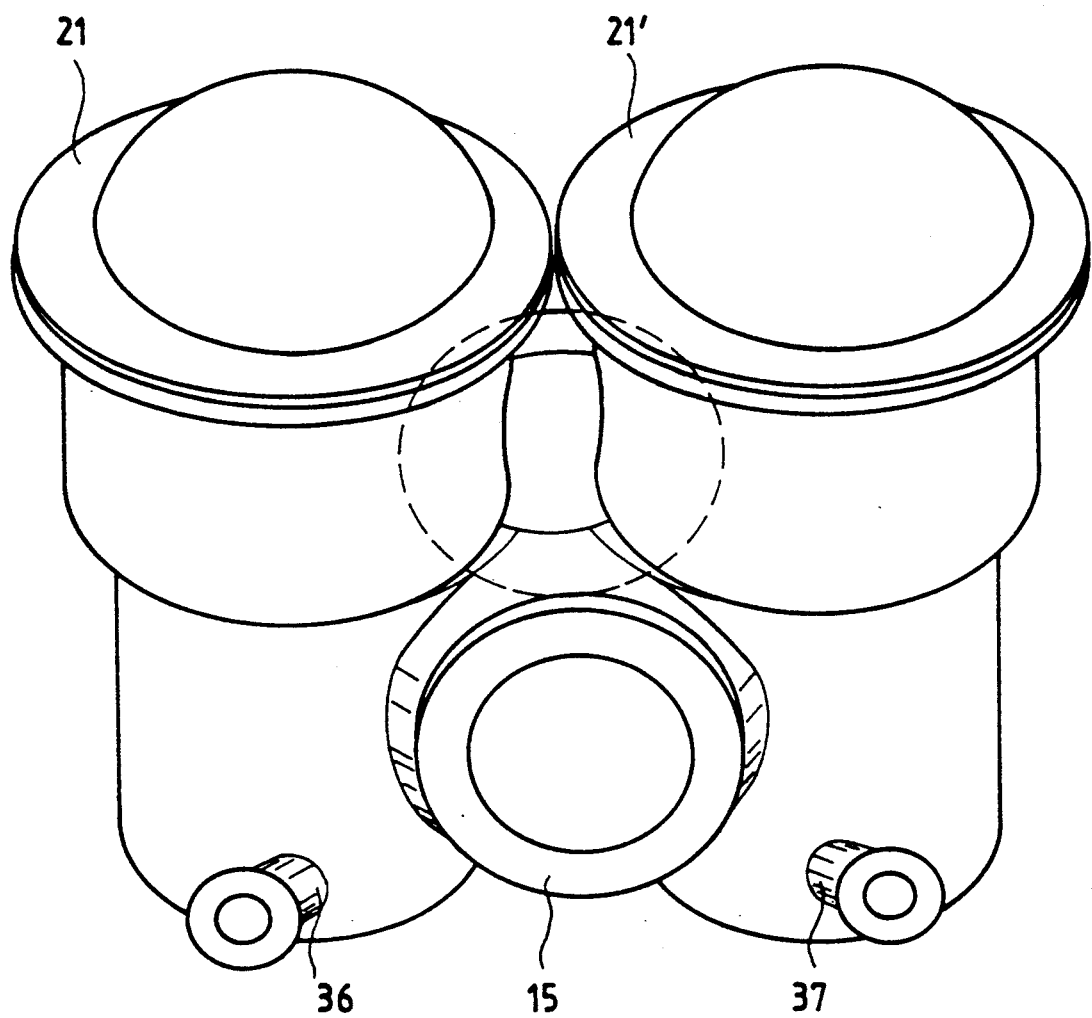
FIG. 4 is a perspective view of the embodiment of FIGS. 1 and 2.

Referring now to the drawings and particularly to FIG. 1, there is shown a pressure sorter 10 of the present invention. Pressure sorter 10 includes two housing parts 4' and 4" (FIG. 2) having in common both the (upper) inlet opening 12 and the (lower) outlet opening 15. Housings 4' and 4" respectively include lids 21 and 21' (FIGS. 2 and 4).

Each housing part 4' and 4" has a screen basket 2 disposed centrally therein and a rotor 3 disposed centrally thereto. Each rotor 3 supports arms 22 extending generally perpendicular from the rotor axis. Affixed at the outer end of support arms 22 are sorting elements 23 spaced relatively slightly from screen basket 2. The cross section essentially perpendicular to the screen basket axis or rotor axis may have the shape of a hydrofoil, i.e., may be wing-shaped.

Located between the rotor 3 and screen basket 2 is a suspension sorting space 16, so to speak on the inflow side, and also an upper inflow space 14 and an inlet space 17 on which borders the inlet opening 12. Respectively located between screen basket 2 and lower housing area 8 and upper housing area 7 is an accepts space 9 and 19. This is in the case of fiber sorting the space in which the accepts share accumulates, i.e., the part of the suspension containing the major share of good fibers. The outlet from the screen sorting space 16 is only indicated here in dash-dot fashion.

Rotor 3 is supported by a rotor shaft 28 through arms 26. A bearing for shaft 28 is located in a bearing housing 25 which is supported by a base plate 24. Rotor shaft 28 is rotatably driven with a pulley 27. A gear drive (not shown) is also possible.

Figure 5:
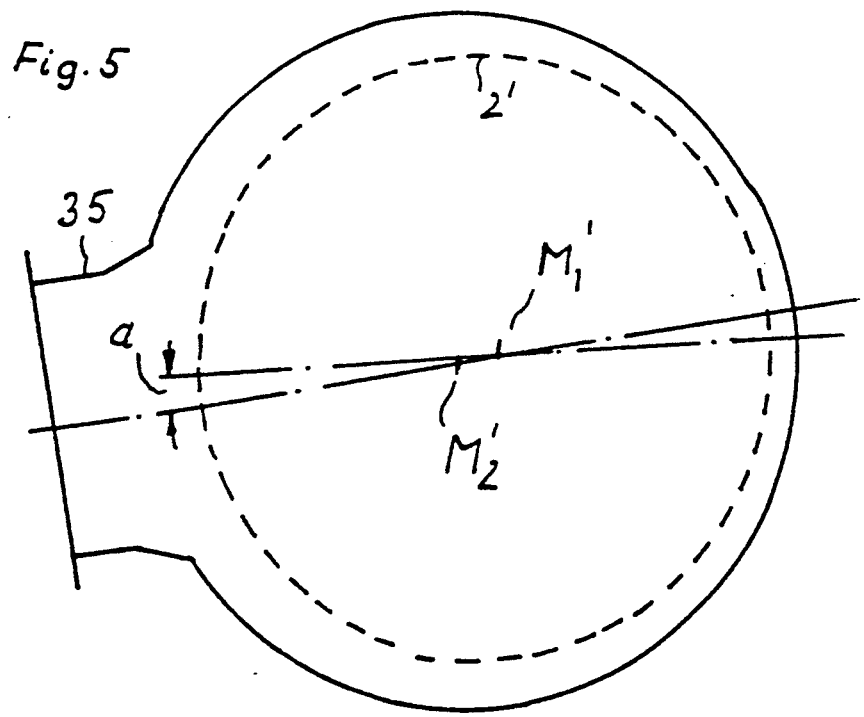
FIG. 5 is a sectional view of an embodiment of the present invention illustrating the offset of the screen basket relative to a housing part.

Referring to FIG. 5, central axis $M_2$ of each housing part 4 is offset in the direction of the outlet flow relative to the pertaining central axis $M_1$ of screen basket 2 or rotor 3 (not shown in FIG. 5 for clarity) along a plane which extends through the central axis of screen basket 2 or rotor 3 and essentially perpendicular to the narrowest cross section 6 of the outlet opening 35. This offset, i.e., the distance between central axes $M_1$ and $M_2$, amounts to about 6 to 12% of the screen basket diameter. The direction of the offset from the housing and screen basket center axis may also deviate up to 15° from the above-described plane, as indicated by the angle $\alpha$ shown in FIG. 5.

The outlet opening 15 (FIGS. 1, 2 and 4) is of a two-part design with the singular outlet opening 15 being created by a transition piece 5. This offset occurs only with respect to the lower housing area 8 of each housing part 4' and 4". The upper housing area 7 is always exactly centered relative to the screen basket 2.

A partition 20 having a truncated cone shape separates the accepts space 19 from the inlet space 17. The flow velocity toward the outlet cross sections of the housing parts 4' and 4" is thereby reduced such that the flow velocity reaches a maximum of 2.5 m/s.

Corresponding to the flow velocity, the static pressure drop is kept low in the accepts space 19. Moreover, a maximum deviation of the flow velocity through the screen basket openings, from an average value (for instance 1.5 m/s, the arithmetic mean based strictly mathematically on the total screen perforation passage area) upward, amounts to a maximum of 25%.

Referring to FIG. 4, outlet opening 15 and outflow channels 36 and 37, in section crosswise to the central axis, are symmetrically arranged for flow-through of suspension. Of course, an outlet 34 arranged centered may be provided for the flow-through.

Figure 3:
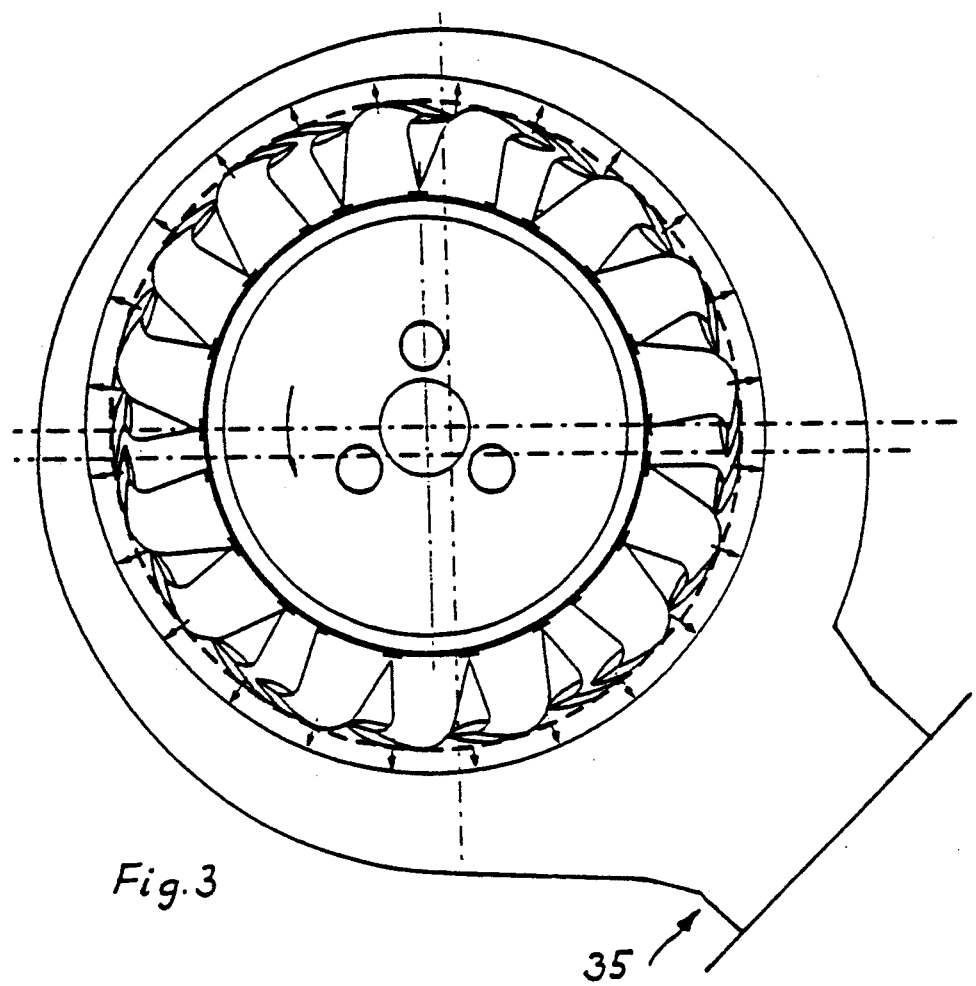
FIG. 3 is a sectional view of another embodiment having a single housing.

Referring now to FIG. 3, pressure sorter 10 has a housing, rotor and screen basket. Outlet opening 35 is the only outlet for the accepts. A single inlet opening and outlet opening (both not shown) are provided for the screen sorting space.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressure sorter for a suspension flow, comprising:
   a cylindrical housing having at least one inlet opening and at least one outlet opening with a defined pressure drop therebetween;
   a rotationally symmetric screen basket disposed within said housing, said screen basket having a plurality of openings defining a total screen perforation passage area;
   a rotor and suspension sorting space disposed centrically within said screen basket; and
   an accepts space disposed radially outward of said screen basket between said screen basket and said housing, said accepts space having a cross section causing a pressure drop between said suspension sorting space and said accepts space resulting in a suspension flow through said screen openings having a maximum velocity of 2.5 m/s, and a deviation to higher suspension flow velocity values from an arithmetic mean value based on the total screen perforation passage area across the entire screen basket circumference amounting to a maximum of 25% of said arithmetic mean value, the pressure drop of the suspension flow in the accepts space smaller than the pressure difference between the suspension sorting space and the accepts space.

2. A pressure sorter for a suspension flow, comprising:
   a cylindrical housing comprising two housing parts, said housing having at least one inlet opening and an outlet opening symmetrically disposed in said two housing parts, said inlet and outlet defining a pressure drop therebetween;
   a rotationally symmetric screen basket disposed within said housing, said screen basket having a plurality of openings defining a total screen perforation passage area;
   a rotor and suspension sorting space disposed centrically within said screen basket; and
   an accepts space disposed radially outward of said screen basket between said screen basket and said housing, said accepts space having a cross section causing a pressure drop between said suspension sorting space and said accepts space resulting in a suspension flow through said screen openings having a maximum velocity of 2.5 m/s, and a deviation to higher suspension flow velocity values from an arithmetic mean valve based on the total screen perforation passage area across the entire screen basket circumference amounting to a maximum of 25% of said arithmetic mean value.

3. A pressure sorter for a suspension flow, comprising:
   a cylindrical housing defining an axis and having at least one inlet opening and at least one outlet opening with a defined pressure drop therebetween,
   a cylindrical screen basket disposed within said housing and defining an axis,
   a rotor and suspension sorting space disposed centrically within said screen basket, and
   an accepts space disposed radially outward of said screen basket between said screen basket and said housing, said accepts space causing a pressure drop of the suspension flow between said suspension sorting space and said accepts space, said static pressure drop smaller than the pressure difference between the suspension sorting space and accepts space such that the flow velocity through said screen basket has a maximum value of 2.5 m/s, and the upward variation of the suspension flow velocity from a mean velocity is less than 25%,
   the axis of said screen basket positioned offset a distance of 6 to 12% of the diameter of said screen basket and disposed in a plane which extends through said housing axis and is perpendicular to said housing outlet opening.

4. A pressure sorter for a suspension flow, comprising:
   a cylindrical housing defining an axis and having at least one inlet opening and at least one outlet opening with a defined pressure drop therebetween, said housing further including a lower housing part and upper housing part, said inlet opening disposed generally axially with said housing axis, said lower housing part disposed in said offset position with about one half of said screen basket located in said offset position, said upper housing part disposed centrically to the center axis of the screen basket and having a truncated cone-shaped partitioning wall tapering away from said lower housing part, a cylindrical screen basket disposed within said housing and defining an axis, a rotor and suspension sorting space disposed centrically within said screen basket, and an accepts space disposed radially outward of said screen basket between said screen basket and said housing, said partitioning wall separating the inlet area from said accepts space, the axis of said screen basket positioned offset a distance of 6 to 12% of the diameter of said screen basket and disposed in a plane which extends through said housing axis and is perpendicular to said housing outlet opening.

5. A pressure sorter for a suspension flow, comprising:

a cylindrical housing comprising two housing parts, said housing having an outlet opening symmetrically disposed in said two housing parts, said housing defining an axis and having at least one inlet opening and at least one outlet opening with a defined pressure drop therebetween, a cylindrical screen basket disposed within said housing and defining an axis, a rotor and suspension sorting space disposed centrically within said screen basket, and an accepts space disposed radially outward of said screen basket between said screen basket and said housing, the axis of said screen basket positioned offset a distance of 6 to 12% of the diameter of said screen basket and disposed in a plane which extends through said housing axis and is perpendicular to said housing outlet opening.

6. A pressure sorter for a suspension flow, comprising:

a cylindrical housing defining an axis and having at least one inlet opening and at least one outlet opening with a defined pressure drop therebetween;

a cylindrical screen basket disposed within said housing and defining an axis;

a rotor and suspension sorting space disposed centrically within said screen basket;

an accepts space disposed radially outward of said screen basket between said screen basket and said housing, said accepts space causing a pressure drop of the suspension flow between said suspension sorting space and said accepts space, said pressure drop smaller than the pressure difference between the suspension sorting space and accepts space such that the flow velocity through said screen basket has a maximum value of 2.5 m/s, and the upward variation of the suspension flow velocity from a mean velocity is less than 25%; and the axis of said screen basket positioned offset a distance of 6 to 12% of the diameter of said screen basket and disposed in one of a plurality of planes having a maximum intermediate angle of 15° with another plane which extends through said housing axis and is perpendicular to said housing outlet opening.

7. A pressure sorter for a suspension flow, comprising:

a cylindrical housing defining an axis and having at least one inlet opening and at least one outlet opening with a defined pressure drop therebetween, said housing further including a lower housing part and upper housing part, said inlet opening disposed generally axially with said housing axis, said lower housing part disposed in said offset position with about one half of said screen basket located in said offset position, said upper housing part disposed centrically to the center axis of the screen basket and having a truncated cone-shaped partitioning wall tapering away from said lower housing part;

a cylindrical screen basket disposed within said housing and defined an axis;

a rotor and suspension sorting space disposed centrically within said screen basket; and an accepts space disposed radially outward of said screen basket between said screen basket and said housing, said partitioning wall separating the inlet area from said accepts space;

the axis of said screen basket positioned offset a distance of 6 to 12% of the diameter of said screen basket and disposed in one of a plurality of planes having a maximum intermediate angle of 15° with another plane which extends through said housing axis and is perpendicular to said housing outlet opening.

8. A pressure sorter for a suspension flow, comprising:

a cylindrical housing defining an axis and having at least one inlet opening and at least one outlet opening with a defined pressure drop therebetween, said housing comprising two housing parts, said outlet opening symmetrically disposed in said two housing parts;

a cylindrical screen basket disposed within said housing and defining an axis;

a rotor and suspension sorting space disposed centrically within said screen basket;

an accepts space disposed radially outward of said screen basket between said screen basket and said housing; and the axis of said screen basket positioned offset a distance of 6 to 12% of the diameter of said screen basket and disposed in one of a plurality of planes having a maximum intermediate angle of 15° with another plane which extends through said housing axis and is perpendicular to said housing outlet opening.

* * * * *